United States Patent

Hutchinson et al.

[11] 4,019,157
[45] Apr. 19, 1977

[54] METHOD AND APPARATUS FOR TUNING HIGH POWER LASERS

[75] Inventors: Donald P. Hutchinson, Knoxville; Kenneth L. Vandersluis, Oak Ridge, both of Tenn.

[73] Assignee: The United States of America as represented by the United States Energy Research and Development Administration, Washington, D.C.

[22] Filed: Apr. 6, 1976

[21] Appl. No.: 674,262

[52] U.S. Cl. .................. 331/94.5 C; 331/94.5 G
[51] Int. Cl.² ........................................ H01S 3/10
[58] Field of Search .............. 331/94.5; 330/4.3

[56] References Cited
UNITED STATES PATENTS

| | | | |
|---|---|---|---|
| 3,531,736 | 9/1970 | Smith | 331/94.5 M |
| 3,609,587 | 9/1971 | Kolb et al. | 331/94.5 D |
| 3,643,175 | 2/1972 | Bhaumik et al. | 331/94.5 G |
| 3,725,814 | 4/1973 | Schlossberg | 331/94.5 S |
| 3,860,884 | 1/1975 | Chang et al. | 331/94.5 G |

*Primary Examiner*—William L. Sikes
*Attorney, Agent, or Firm*—Dean E. Carlson; David S. Zachry; Louis M. Deckelmann

[57] ABSTRACT

This invention relates to high power gas lasers that are adapted to be tuned to a desired lasing wavelength through the use of a gas cell to lower the gain at a natural lasing wavelength and "seeding" the laser with a beam from a low power laser which is lasing at the desired wavelength. This tuning is accomplished with no loss of power and produces a pulse with an altered pulse shape. It is potentially applicable to all gas lasers.

6 Claims, 2 Drawing Figures

METHOD AND APPARATUS FOR TUNING HIGH POWER LASERS

BACKGROUND OF THE INVENTION

This invention was made in the course of, or under, a contract with the United States Energy Research and Development Administration.

Gas lasers, of which the $CO_2$ laser is typical, produce a lasing wavelength which is characteristic of the gas. For example, the $CO_2$ laser generally produces an output having a wavelength of 10.59 $\mu m$. However, since the gain profile over a range of frequencies is quite flat, other nearby frequencies may also be present in the output. When an exact wavelength is desired from among these "natural frequencies," an internal grating is normally used. This has, however, two limitations: a loss of approximately one-half the laser power; and a limitation of the power density upon the grating. To date, these grating systems have been limited to lasers of about 30 M watts pulsed. No adequate means was known to tune a laser of 850 M watts pulsed, especially a $CO_2$ laser to run at 9.55 $\mu m$.

Thus, a need exists for some means and/or a method for tuning a gas laser to a desired wavelength with no loss of power. This need has been met in the present invention in a manner to be described hereinbelow.

SUMMARY OF THE INVENTION

It is the object of the present invention to provide an improved means for tuning a gas laser to a desired wavelength with no loss of power.

The above object has been accomplished in the present invention by effecting the tuning of a high power gas laser to a desird lastig wavelength through the use of a gas cell to lower the gain at a natural lasing wavelength and "seeding" the laser with the beam from a low power laser which is lasing at the desired wavelength which beam is injected into the high power laser through a small hole in the rear reflector thereof. The injected signal from the low power laser overrides the spontaneous emission which normaly starts the laser oscillation and locks the high power laser to the injection frequency.

DESCRIPTION OF THE PREFERRED EMBODIMENT

Figure 1:
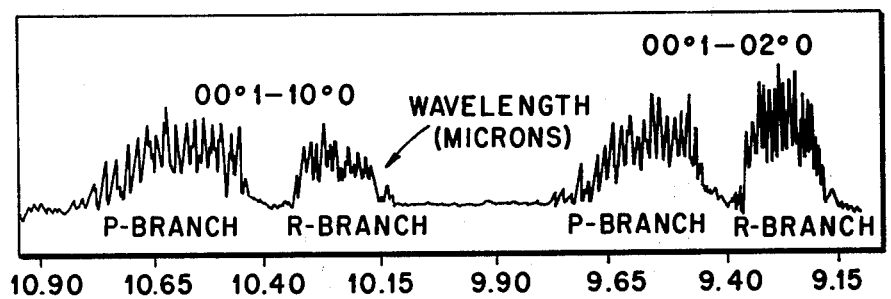
FIG. 1 illustrates the complex spectral output of a commercial $CO_2$ laser.

A gas laser actually can produce an output at many frequencies that are characteristic of the specific gas. For example, the typical spectrum of a commercial $CO_2$ laser (TEA-103, Lumonics Research Ltd., Ontario, Canada) is illustrated in FIG. of the drawing. With a broad band rear reflector, as normally used, lasing will take place strictly on the 10.59 micrometer P(20) transition. With an internal grating, lasing can be produced on 50 to 80 individual lines. However, gratings are only commonly available up to a 2 inch diameter and thus can be used with lasers producing of the order of 10–20 joules or less.

In research toward the measurement of ion temperature by Thompson scattering in a high temperature plasma having a density of about $10^{14}/cm^3$, it has been calculated that a 300 KW-1MW FIR (far-infrared) laser will be required. The scattered signal of about $10^{-8}$ watts will be detected by a heterodyne Schottky-barrier diode receiver. The length of the laser pulse must be $\geq$ 100 nsec to allow analysis of the scattered spectrum by the receiver. The receiver requirements dictate a FIR laser pulse energy of $\geq$ 0.1 joule. The FIR laser pulse will be generated by optically pumping $CH_3F$ gas with a $CO_2$ laser operating at 9.55 $\mu m$ to yield a FIR wavelength of 496 $\mu m$. Because of the low conversion efficiency of $CO_2$ power to FIR power (about 0.15%), a 35 to 70 joule $CO_2$ TEA (transversely Excited, Atmospheric Pressure) laser will be required for the pump laser. As stipulated above, $CO_2$ TEA lasers of this energy cannot be tuned by any of known prior art methods.

Pulsed $CO_2$ oscillators normally lase on the transition which possesses the highest gain at the beginning of the pulse. Oscillations build up from a photon flux produced by spontaneous emission. Usually the P(20) transition in the 10 $\mu m$ band is predominant. In order to prevent a build-up on a spontaneous photon flux, the investigations were begun to provide an initial signal tuned to the desired laser line. Experiments were performed which were intended to produce laser oscillation at 9.55 $\mu m$, the P(20) transition in the 9 $\mu m$ band. Insufficient injected power was available to override the high gain of the P(20) transition in the 10 $\mu m$ band. However, a small amount of 9.55 $\mu m$ radiation was noted.

In a effort to completely suppress the 10.59 $\mu m$ oscillation, according to the present invention, a gas cell containing $SF_6$ (sulfur hexafluoride) was placed in a TEA $CO_2$ laser cavity since $SF_6$ exhibits a strong absorption in the 10 $\mu m$ band. The $SF_6$ pressure was increased and, at $\geq$ 500 $\mu$.Hg, the laser shifted to an oscillation at the P(20) transition in the 9 $\mu m$ band with no measurable loss of energy in the pulse. Injection of a 9.55 $\mu m$ signal from a low power CW laser into the TEA laser then brought about the desired oscillation of the TEA laser at 9.55 $\mu m$, the P(20) transition of the 9 $\mu m$ band.

Figure 2:
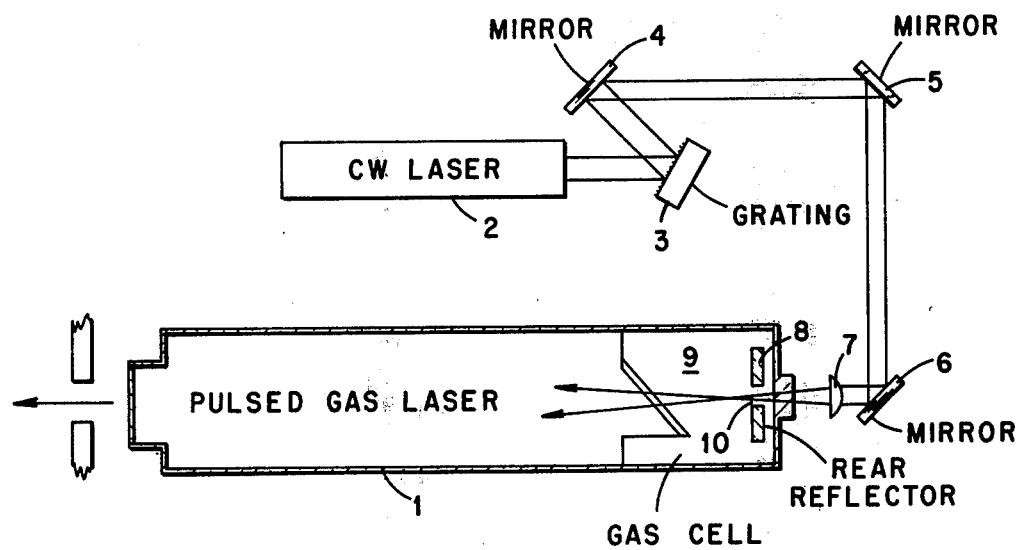
FIG. 2 is a schematic diagram illustrating the means for tuning a high power gas laser to a desired specific wavelength.

The configuration for the tuning of a high power gas laser is illustrated in FIG. 2 of the drawing. The high power pulsed gas laser 1 of FIG. 2 is a 10 joule $CO_2$ TEA 202/102 laser as manufactured by Lumonics, Ontario, Canada, for example. The low power CW laser 2 is a 30 watt Invar stabilized cavity grating-tuned $CO_2$ laser, for example. Initially the CW laser 2 signal was injected by means of a grating 3, a mirror 4, a mirror 5, a mirror 6, and focusing lens 7 through a 0.5 mm opening 10 in the rear reflector 8 of the laser 1 into the gas cell cavity 9 of the laser 1, the cavity 9 containing $SF_6$, for example, at a desired pressure, as mentioned above. However, a hole size of 1.0 mm in diameter for the hole 10 in the rear reflector 8 is the preferred size, since by utilizing such a hole size, full conversion in the laser 1 to the 9.55 $\mu m$ radiation is then made possible. Less input power is thus probably adequate with the larger opening for the hole 10. Furthermore, a longer focal length lens will concentrate the injected signal from the laser 2 and thus should further reduce the power requirements for seeding (tuning) the pulsed power laser 1. The power of the laser 2 is generally proportional to the diameter of the pulsed laser 1.

It has been determined that as the CW laser 2 is tuned to other transitions in the 9 μm band, the TEA laser 1 frequency tracks this "seed" frequency. Furthermore, when the CW laser 2 is tuned to produce two simultaneous frequencies in the 9 μm band, these two frequencies are produced in the TEA laser 1 in approximately the same proportions as the injection frequencies. Thus, it may be possible to produce a tunable far-infrared radiation by using a frequency difference technique by first producing two frequencies in one laser.

Analyses of the pulse shape and energy per pulse have been made to compare the above described method of operation to that without injection. In some cases, the rise time of the pulse is shortened and more power is provided in each pulse when injection is used. When the injection power is increased further, the gainswitched pulse is suppressed and a more rounded pulse of longer duration is produced. Thus, injection or "seeding" techniques are advantageous for pulse shaping and pulse power even when no frequency shifting is desired. It should again be noted that little, if any pulse shaping can be obtained with dispersive elements, such as gratings, for example.

According to the present invention, as described hereinbelow, it has been determined that a gas laser with multimode optics, and with no frequency-determining elements in the cavity, may be tuned over a range of a few micrometers without any dispersive elements through the use of an intra-cavity gas cell at a desired pressure and the injection of a low power laser beam into the gas cell cavity at a frequency corresponding to the desired lasing frequency. Furthermore, this device or method of tuning provides a realization of the full power of the laser and assists in the shaping of the laser output pulses. The method is particularly applicable (for tuning) when using 10–20 joule (or greater) lasers larger than 2 inches in diameter.

It should be understood that the present method of tuning a laser can be utilized with other types of gas lasers. For example, a methyl fluoride laser must be operated at 496 μm. Such a laser may be useful in laser radar and communication applications. Also, other absorption gases may be useful for some applications: this depends upon the frequencies that are to be absorbed. While a $CO_2$ laser has been used to produce the required seed signal, other applications may necessitate gas lasers other than $CO_2$ to achieve a specific frequency (each gas has unique transition frequencies). A dye laser may be used, for example, as it may be utilized for a wide range of frequencies to achieve the frequency desired for tuning a high power laser.

A high power laser which is tuned to a desired frequency in accordance with the present invention, as described above, can be used in the measurement of ion temperature, for radar and communication applications, and possibly for isotope separations, for example.

This invention has been described by way of illustration rather than by limitation, and it should be apparent that it is equally applicable in fields other than those described.

What is claimed is:

1. In a high power pulsed gas laser of the type having an optically resonant cavity filled with a first gas capable of lasing at natural frequencies characteristic of said first gas, the cavity being bounded at one end by a rear reflector, the improvement comprising means for tuning said laser to a desired frequency, said tuning means including a gas cell mounted within said cavity adjacent to said rear reflector, said gas cell containing a second gas at a desired pressure and capable of reducing the gain of the natural lasing frequencies of said first gas; a second low power laser adapted to be operated at said desired frequency; a focusing lens; said rear reflector provided with a small centrally positioned hole with a desired diameter; and means for directing the output of said second laser through said focusing lens and through said rear reflector hole into said gas cell and cavity, whereby said second laser acting in conjunction with said gas cell in said high power laser effects the tuning of said high power laser to said desired frequency of said second laser without the loss of power in the output of said high power laser.

2. The device set forth in claim 1, wherein said first gas is $CO_2$, said high power laser having an output of a selected value in the range of 10–20 joules.

3. The device set forth in claim 2, wherein said second gas in said gas cell is $SF_6$ and said gas pressure is at least 500 μ Hg.

4. The device set forth in claim 3, wherein said desired diameter of said rear reflector hole is about 1.0 mm.

5. The device set forth in claim 3, wherein said second laser is a 30 watt stabilized cavity grating-tuned $CO_2$ laser.

6. The device set forth in claim 3, wherein said second laser is a dye laser.

* * * * *